(12) United States Patent
Dostmann et al.

(10) Patent No.: US 8,602,364 B2
(45) Date of Patent: Dec. 10, 2013

(54) TRAILING-EDGE FLAP SYSTEM

(75) Inventors: Tom Dostmann, Amtsberg-Dittersdorf (DE); Bernhard Schlipf, Bremen (DE); Jochen Eichhorn, Neidenfels (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/468,099

(22) Filed: May 10, 2012

(65) Prior Publication Data

US 2013/0119194 A1 May 16, 2013

Related U.S. Application Data

(63) Continuation of application No. PCT/EP2010/006851, filed on Nov. 10, 2010.

(60) Provisional application No. 61/259,723, filed on Nov. 10, 2009.

(30) Foreign Application Priority Data

Nov. 10, 2009 (DE) .......................... 10 2009 052 641

(51) Int. Cl.
*B64C 3/50* (2006.01)
(52) U.S. Cl.
USPC ........................................ 244/215; 244/217

(58) Field of Classification Search
USPC ......................................... 244/213–217, 131
See application file for complete search history.

(56) References Cited

U.S. PATENT DOCUMENTS

| 3,704,828 A | * | 12/1972 | Studer et al. | 239/265.19 |
|---|---|---|---|---|
| 7,510,151 B2 | | 3/2009 | Perez-Sanchez | |
| 8,393,570 B2 | * | 3/2013 | Gartelmann | 244/99.3 |
| 2005/0116115 A1 | * | 6/2005 | Perez-Sanchez | 244/212 |

FOREIGN PATENT DOCUMENTS

| DE | 103 28 540 A1 | 2/2005 | |
|---|---|---|---|
| DE | 10328540 A1 * | 2/2005 | ............... B64C 9/34 |
| FR | 2 884 221 A1 | 10/2006 | |
| WO | WO 2011/057778 | 5/2011 | |

OTHER PUBLICATIONS

International Search Report for Application Serial No. PCT/EP2010/006851 dated Jul. 4, 2011.

* cited by examiner

*Primary Examiner* — Timothy D Collins
*Assistant Examiner* — Jamie S Stehle
(74) *Attorney, Agent, or Firm* — Jenkins, Wilson, Taylor & Hunt, P.A.

(57) ABSTRACT

A trailing-edge flap system is described. The trailing-edge flap system includes a trailing-edge flap and a movement device. The movement device includes at least a translatory mover for the translation of the trailing-edge flap and at least a rotational mover for the rotation of the trailing-edge flap.

19 Claims, 9 Drawing Sheets

TRAILING-EDGE FLAP SYSTEM

CROSS-REFERENCE TO RELATED APPLICATIONS

The present application is a continuation of International Application No. PCT/EP2010/006851, filed on Nov. 10, 2010, which claims priority from German Application DE 10 2009 052 641.2, filed on Nov. 10, 2009, and claims the benefit of U.S. Provisional application 61/259,723, filed on Nov. 10, 2009, each of which is hereby incorporated in its entirety by reference.

FIELD OF THE INVENTION

Various embodiments of the invention relate to a trailing-edge flap system for the aerofoil of an aircraft.

BACKGROUND

Known trailing-edge flap systems for aerofoils of aircraft are required in order to create increased lift in specific flying situations and therefore, for example, in order to make it possible to fly more slowly. These specific flight situations are particularly the landing approach and the landing itself as well as the entire take-off process. The trailing-edge flaps, which are also referred to as landing flaps, can be extended using the known trailing-edge flap systems and both the surface of the wing as well as the curvature of the aerofoil profile are thus increased. In order to prevent a stall at the aerofoil during this increase, a defined opening or 'gap' between the aerofoil and the trailing edge as well as a projection or 'overlap' of the aerofoil over the trailing-edge flap are required from an aerodynamic point of view. The term 'trailing edge' refers to the arrangement of the flap, namely at the rear edge of the respective aerofoil in the direction of flight.

For example known trailing-edge flaps use rail systems for the movement of the trailing-edge flaps, on which rail systems the trailing-edge flaps can be moved in a guided manner. A drawback of these rails is their constructional shape beneath the aerofoil and their subsequent influence on the aerodynamics. In particular their flow resistance is disadvantageous with regard to flight stability and fuel consumption. Furthermore, the known trailing-edge flaps cannot be adapted completely to the aerofoils, so aerodynamic integration into the aerofoil contour is not possible. Instead, fairings are necessary, which also pose the drawback of increased flow resistance.

A trailing-edge flap system is known from DE 103 28 540 that is constructed without a rail system. A telescope drive is used for movement of the trailing-edge flap. A lever system is used for rotation of the trailing-edge flap and utilises the relative movement between two telescopic boxes for rotation of the trailing-edge flap. However, a drawback of a system of this type is the hindered design with regard to known design criteria. The design of a trailing-edge flap is defined over three positions. These are based on three flight situations. The '0°' position is thus provided for cruising, in which the trailing-edge flap is retracted and not rotated. The two other design positions are found in the extended state of the trailing-edge flap. Within the scope of this application, the 10° and 40° positions are used purely in an exemplary manner. Of course, other positions in the extended state are also possible as design positions. The '10°' position is provided as an example of the take-off process, in which position the trailing-edge flap is extended over a defined gap and a defined overlap, and includes a rotation of 10°. The '40°' position is provided as an example of the landing process in this application, in which position the trailing-edge flap is extended over a defined 'gap' and a defined 'overlap', further than in the 10° position, and includes a rotation of 40°. The problem of the embodiment of a system according to DE 103 28 540 is the fact that only linear movements are possible using the telescope drive, but the pivot for the three design positions (in this instance at 0°, 10° and 40°), do not necessarily lie on a straight line. The design of this known system cannot thus be realised, or can only be realised in a defective manner, which virtually blocks the market for development of a system to be permitted for air service. The system known from DE 103 28 540 is also disadvantageous since the trailing-edge flap is rotationally mounted via the lever kinematics of the rotational movement. This arrangement is disadvantageous with regard to the air loads that occur during flight operations since relatively large levers transfer the force of the air load and the bearings of the lever kinematics must be configured so as to be correspondingly strong.

SUMMARY

Various embodiments of the invention provide a trailing-edge flap system that exhibits a reduced flow resistance and therefore can be designed in accordance with the conventional design criteria in the field of aviation.

A trailing-edge flap according to various embodiments of the invention includes a trailing-edge flap and a movement device, the movement device comprising at least one translatory mover for the translation of the trailing-edge flap and at least one rotational mover for the rotation of the trailing-edge flap. The translatory mover is further able to move the trailing-edge flap along a line of translatory movement. Depending on the translatory movement, the rotational mover rotates the trailing-edge flap. A translation angle between the line of translatory movement and the chord line of the aerofoil belonging to the trailing-edge flap is selected in such a way that a pivot bearing point for the pivot of rotation of the trailing-edge flap is given from the aerodynamic demands placed on the translatory movement and rotational movement, which pivot bearing point preferably lies within the contour of the trailing-edge flap. This configuration of the trailing-edge flap system makes it possible for a number of advantages to be achieved: on the one hand the pivot of the trailing-edge flap can be arranged within the contour of this flap. The pivot can thus also be mounted within this contour and additional fairing parts for the pivot and its articulation can be dispensed with. This embodiment thus has a more compact outer contour and therefore exhibits less flow resistance. A further advantage is the type of selection of the translation angle. This is selected as a function of the pivot bearing point resulting from it. The translation angle that leads to a pivot bearing point within the contour of the trailing-edge flap is thus selected from the constructionally optimised translation angles in a further optimisation step. The constructional design with a translation angle according to various embodiments of the invention makes it possible to achieve a purely linear translatory movement, what's more with minimal fairing parts beyond the wing. The trailing-edge flap can be virtually completely integrated into the aerofoil contour, at least during cruising. This simple yet very functional design thus makes it possible to use purely linearly operating translatory movers, for example a telescope drive, which is economical.

Furthermore, a trailing-edge flap system according to various embodiments of the invention can be formed in such a way that the translatory mover is configured as a telescope drive. This embodiment is only made possible by the arrangement according to various embodiments of the invention of the pivot bearing and the translation angle. The advantages of a telescope drive lie, inter alia, in its very compact structure. In the retracted state of the trailing-edge flap a very small construction volume is thus sufficient in order to house the telescope drive even within the aerofoil to which the trailing-edge flap belongs. This embodiment in turn makes it possible to dispense with additional fairing parts and therefore to reduce the flow resistance. However, a curved translatory movement can also be effected by more complex telescope drives, for example with curved telescopic boxes. However, the curvature is limited to a single, constant radius of curvature over the entire translatory movement. Since, in a trailing-edge flap system according to various embodiments of the invention however, the three design points can be interconnected by a simple curvature of this type, even further optimisation of the accuracy when passing through the design positions is possible.

A trailing-edge flap system according to various embodiments of the invention can advantageously be formed in such a way that the pivot bearing point lies in the region from 20% to 60% of the flap depth of the trailing-edge flap in the direction of flight. In particular, the pivot bearing point lies in front of the region in which the point of application of the resultant force of the air load in all movement positions of the trailing-edge flap is arranged. This further restriction to the arrangement of the pivot bearing point brings further advantages. The relation of the pivot bearing point to the point of application of the resultant force of the air load during cruising can thus be defined. Since the resultant force of the air load normally lies in the region between 33% and 50% of the flap depth of the trailing-edge flap, the pivot bearing point is disposed in front of the point of application of the resultant force of the air load in the direction of flight, at least in most flight situations. However, it should be kept in mind that this point of application varies within a range as a function of the position of the trailing-edge flap. The relation according to various embodiments of the invention of the pivot bearing point to the point of application of the resultant force of the air load causes restoring forces to be exerted on the trailing-edge flap in addition to bending forces. In other words the applied air load tries to rotate the trailing-edge flap back into its starting position. The restoring forces thus act against the directions of movement of the translatory mover and the rotational mover. The protection of the two movers against undesired movement in the direction of extension or against further rotation thus constitutes a mechanism not used for normal flight situations. This arrangement is furthermore advantageous since the orientation of the resultant force of the air load and its leverage relative to the pivot bearing point includes the same direction of torque for the entire movement of the trailing-edge flap. An alternation in the direction of rotation of the torque during the extension or retraction process is thus avoided. An alternation in the direction of rotation of this type would require a change in the movement device from sliding to retaining during the extension movement. A further advantage posed by this arrangement is the reduction in the leverage forces produced by the distance between the point of application of the resultant force of the air load and the pivot bearing point. The reduction in the distance and the resultant reduction in the leverage forces make it possible to achieve a smaller dimensioning of the pivot bearing. Production costs and, above all, weight and therefore fuel during air service can thus be saved.

It can be advantageous if, in a trailing-edge flap according to various embodiments of the invention, the translation angle between the line of translation and the chord line of the aerofoil belonging to the trailing-edge flap ranges between 10° and 20°, preferably from 14 to 17, particularly preferably from 14 to 15. The translation angle decisively influences the position of the pivot bearing point depending on the geometry of the aerofoil, the trailing-edge flap and their relation to one another. In order to now obtain the position according to various embodiments of the invention of the pivot bearing point, angular ranges are possible depending on the aforementioned geometries, within which ranges further constructional considerations can lead to the final angle selection. For example these further considerations can be based on the space available for the translatory mover in the aerofoil.

It can be furthermore advantageous if, in a trailing-edge flap system according to various embodiments of the invention, the telescope drive includes at least two telescopic boxes and the telescopic boxes of the telescope drive can be maximally extended with an at least partial overlap of more than 50%. Depending on the structure, a number of telescopic boxes, in particular four telescopic boxes may also be expedient. The overlap of the telescopic boxes brings the advantage that the forces introduced into the trailing-edge flap by the air load can be transferred via extensive connections between the individual telescopic boxes. Constructionally more complex stiffening possibilities, such as ribs or reinforced material can thus be avoided. In addition to a reduction in production costs, this also leads to reduced weight and therefore also to reduced fuel costs during air service.

For example an overlap of this type is only provided in the region in which the majority of the forces are transferred. The space above the telescope drive can thus be utilised in such a way that the telescopic boxes are extended in their upper region. The overlap in the upper region in which the majority of forces are transferred is thus increased since the upwardly directed bending forces resulting from the air load during air service predominantly exhibit this direction of force. The necessary stiffening can thus be achieved without unnecessarily increasing the total weight of the telescopic boxes.

For example a trailing-edge flap system according to various embodiments of the invention can be improved yet further by defining the maximum length of the extended telescope drive as 2 to 4 times the distance between the aerofoil end of the telescope drive and the trailing-edge flap end of the telescope drive in the retracted state. The maximum length in the extended state and the desired overlap of the individual telescopic boxes give the number of individual telescopic boxes together with their length.

A further advantage can be achieved if, in a trailing-edge flap system according to various embodiments of the invention, all components of the trailing-edge flap system can be preassembled in a module. This possibility for preassembly poses the advantage that the module is produced separately from the aerofoil and can be assembled in a finished state. Even operational testing can be carried out independently of the aerofoil. The preassembled and tested trailing-edge flap system can thus be assembled at the aerofoil during assembly of the wing by a simple assembly process. The cost and complexity of final assembly is thus reduced considerably. The inclusion of defective trailing-edge flap systems in the final assembly can also be avoided since operational testing can be carried out previously.

When using a telescope drive for the translatory mover of a trailing-edge flap system according to various embodiments of the invention it may be advantageous for a rotation actuator to be provided for the telescope drive. A rotation actuator of this type extends the outermost telescopic box, which entrains the intermediate telescopic boxes. A rotation actuator poses the advantage that it drives the translatory mover using particularly simple lever kinematics. This rotation actuator is advantageously arranged within the telescope drive, i.e. within the telescopic boxes. The rotation actuator also does not therefore have to be separately encased, which also avoids increased flow resistance as well as additional weight.

Alternatively, in a trailing-edge flap system according to various embodiments of the invention a synchronising telescope cylinder may be provided for the telescope drive. This synchronising telescope cylinder poses a decisive advantage. It is thus possible with this for the individual telescopic boxes to be extended relative to one another in a defined manner. For embodiments that require a defined relative movement of the telescopic boxes to one another, it is possible to dispense with a control gear within the telescopic boxes when using a synchronising telescope cylinder. A scissor lever construction that is connected to the individual telescopic boxes and thus also makes it possible to extend the individual telescopic boxes in a defined manner can also be used as an alternative to the synchronising telescope cylinder.

In order to make the translatory movement yet simpler still and to nevertheless make it possible to provide an efficient transfer of force from the trailing-edge flap to the aerofoil to support the air load during air service, it may be advantageous in the case of a trailing-edge flap system according to various embodiments of the invention if sliding cushions are provided in each case as a linear bearing for the transfer of force between the telescopic boxes of the telescope drive. The sliding cushions are provided with a dry friction layer. The sliding cushions are further advantageously provided with a substantially constant radius when their sliding face is unloaded. A constant force transfer surface can thus be maintained when the individual telescopic boxes are subject to bending deformation relative to one another. The sliding cushions are in each case mounted in one of the telescopic boxes in a linearly rigid manner.

For some embodiments of a trailing-edge flap system it may be further advantageous for control gears ( ) to be provided between the individual telescopic boxes ( ). Control gears of this type are particularly expedient if there is a defined relative movement between the individual telescopic boxes during the translatory movement. If a defined relative movement of this type is not already ensured by the telescope drive itself, an adjustment by the use of control gears may be expedient or even required from a safety point of view. A control gear of this type also cooperates with three telescopic boxes abutting one another. For example the cooperation can be produced via a gearwheel system, a pulley system or scissor kinematics. The relative movement when extending the telescope drive can be set by a control gear of this type. For example a 1:1 relation can be set. This means that the telescopic boxes are moved uniformly, i.e. they are all moved by substantially the same relative distance per unit of time.

A possible embodiment for the rotational mover of a trailing-edge flap system is in the form of lever kinematics. Lever kinematics of this type provides the rotational movement as a result of individual lever conditions relative to one another. A plurality of pivot bearings are provided for lever kinematics of this type, at which bearings the individual levers are rotatably mounted. The use of lever kinematics poses the advantage that it is easy to configure and also very reliable during application. The reliable application is of great advantage during use in the field of aviation.

In a trailing-edge flap system according to various embodiments of the invention the trailing-edge flap is advantageously mounted rotatably in the pivot bearing point independently of the lever kinematics in the trailing-edge flap system. The lever kinematics is thus completely decoupled from the rotatable mounting of the trailing-edge flap. This decoupling poses the advantage that the pivot bearing point and the pivot bearing provided there for the trailing-edge flap can be exclusively focussed, with regard to their construction, on stability as well as cost and weight savings. The lever kinematics can, in turn, be constructed and above all placed independently of the pivot bearing of the trailing-edge flap. Arrangements are thus possible that disappear completely within the installation space of the trailing-edge flap system or at least only project to a small extent. Additional fairing can thus be dispensed with or reduced to a necessary minimum. In addition to the material saving associated with this, a reduction in the flow resistance is again achieved. Four different lever kinematics will be presented below as an example.

A possibility for the embodiment of a trailing-edge flap system according to various embodiments of the invention is characterised in that the rotational mover is lever kinematics with a first pivot arranged at the last telescopic box for a first lever and a second lever, which are arranged at a fixed angle to one another. A second pivot is further arranged at the penultimate telescopic box for a third lever, which is connected to the second lever via a third pivot. A fourth lever is coupled via a fourth pivot at the end of the first lever to a fifth pivot acting as a flap end. This kinematic principle couples the translatory movement directly with the rotational movement in such a way that the rotational movement follows the translatory movement so to speak. A special drive is no longer necessary for the rotation. Instead the rotation is dependent on the translatory movement and is thus defined precisely. In order to realise a design of this type it is necessary for at least the movement of the two last telescopic boxes to extend in a defined relation to one another. This can be achieved either by the selection of the drive for the translatory mover or by the provision of a control gear, as has already been explained.

A further possibility for the lever kinematics of a trailing-edge flap system according to various embodiments of the invention is very similar to the possibility described above, whereby the second pivot is arranged not at the penultimate telescopic box, but at the antepenultimate telescopic box. The advantages of a system of this type are identical to those described above, in this instance the lever path having been doubled by the articulation at the antepenultimate telescopic box. The lever path necessary for rotation can thus be provided, even with small relative movements of the individual adjacent telescopic boxes. This variation of the pivot also makes it possible to precisely adjust the force, which can be changed with the lever path that is definable by the variation. The dependency of the rotational movement on the translatory movement can thus also be adjusted. It is therefore possible to set non-linear correlation between translatory movement and rotational movement. If the construction requires, it is of course also possible for an articulation to be formed at a front telescopic box, again in the direction of flight.

A further alternative for a trailing-edge flap system according to various embodiments of the invention is if the rotational mover is lever kinematics whereby a stationary pivot bearing is provided for a single lever that is coupled to the trailing-edge flap in a second pivot at the end of a connection bar. Although in an embodiment of this type part of the kinematics does project beyond the contour of the trailing-edge flap, this drawback is less serious with only a single lever owing to the very simple embodiment of the lever kinematics. The use of a single lever increases the operational reliability of the trailing-edge flap system according to various embodiments of the invention.

In a trailing-edge flap system according to various embodiments of the invention the rotational mover can be configured in such a way that a first stationary pivot is provided for a first lever and a second stationary pivot, which is distanced from the first pivot, is provided for a second lever. A rigid angle lever is further provided, which is coupled by its first end via a third pivot to a connection bar at the trailing-edge flap. At its apex the angle lever is pivotally connected to the first lever as well as at its second end to the second lever. This design is a development of the design described above with a single lever, it being possible to overcome its drawback of the protrusion of the lever kinematics. The entire lever kinematics lies within the wing contour as a result of the rigid angle lever. Additional fairings are therefore unnecessary in this instance. A further advantage of this construction is the possible drive reversal. If the previous lever kinematics is configured in such a way that the rotational movement is initiated by the translatory movement and follows this, this dependency can thus be swapped in this instance. It is possible to drive the lever kinematics actively and for the telescope drive to follow this rotational movement.

Other embodiments provide a wing for an aircraft including at least a trailing-edge flap system according to various embodiments of the invention. Since a trailing-edge flap system according to various embodiments of the invention can be configured in a particularly compact manner, as already described, it is possible to integrate this system into the contour of the aerofoil. A wing can thus be created that includes fewer fittings and/or fairing parts and therefore exhibits less flow resistance in the cruising position of the trailing-edge flap.

Further embodiments provide a method for ascertaining a translation angle for a trailing-edge flap system. As already described with regard to the trailing-edge flap system, the translation angle is defined by the line of translatory movement and the chord line of the associated aerofoil. The line of translatory movement is defined by the three positions of the pivot bearing point for the three given positions of the flap. Reference is made to the fact that, for three predetermined positions of the trailing-edge flap including the rotational position of the trailing-edge flap, i.e. the three design positions, precisely one pivot bearing point is given in the flap-fixed coordinate system per translation angle. The method includes:

the relevant pivot bearing points are ascertained for different translation angles;

the pivot bearing points that lie within the outer contour of the trailing-edge flap are selected from the pivot bearing points ascertained;

one of the associated translation angles is selected from the pivot bearing points ascertained.

BRIEF DESCRIPTION OF THE DRAWINGS

Embodiments of the invention will be described hereinafter in greater detail with reference to the accompanying figures, in which the terms "above", "below", "left" and "right" are based on the drawings in the figures oriented so the reference numerals can be read normally, and in which:

FIG. 9b is a side view with partially transparent surfaces of a trailing-edge flap system according to an embodiment of the invention with the telescopic boxes from FIG. 9a.

DESCRIPTION

The design of the trailing-edge flap system 10 will be explained with reference to FIGS. 1 and 2. In both figures the trailing-edge flap 20 is shown in three states. These three states correspond to the three design positions for cruising, take-off and landing. In the position for cruising the trailing-edge flap 20 is in the retracted position without rotation, which is why this position will be called the 0° position hereinafter. In the position for take-off the trailing-edge flap 20 is in a partly extended state and rotated through 10°, which is why this position will be referred to as the 10° position hereinafter. In the position for landing the trailing-edge flap 20 is in a fully extended state and rotated through 40°, which is why this position is referred to as the 40° position hereinafter. For aerodynamic reasons there are two decisive variables for the individual positions, these variables also being shown in FIG. 2. In order to avoid stalling with increased wing surface an opening or "gap" is provided between the trailing-edge flap 20 and the aerofoil, and an "overlap", i.e. an overlap between the rear edge of the aerofoil and the trailing-edge flap 20 is also provided. Depending on the position of the trailing-edge flap 20, different values must be observed for these two parameters.

In order to determine the pivot bearing point 22, a flap-fixed point is ascertained. As shown in FIG. 2, for this purpose all three positions are shown in one illustration and a local coordinate system is given that is entrained with the trailing-edge flap 20. The flap-fixed point has identical coordinates in the local coordinate system for all positions of the trailing-edge flap 20 and forms the axis of rotation for the trailing-edge flap 20 as a pivot bearing point 22.

Figure 1:
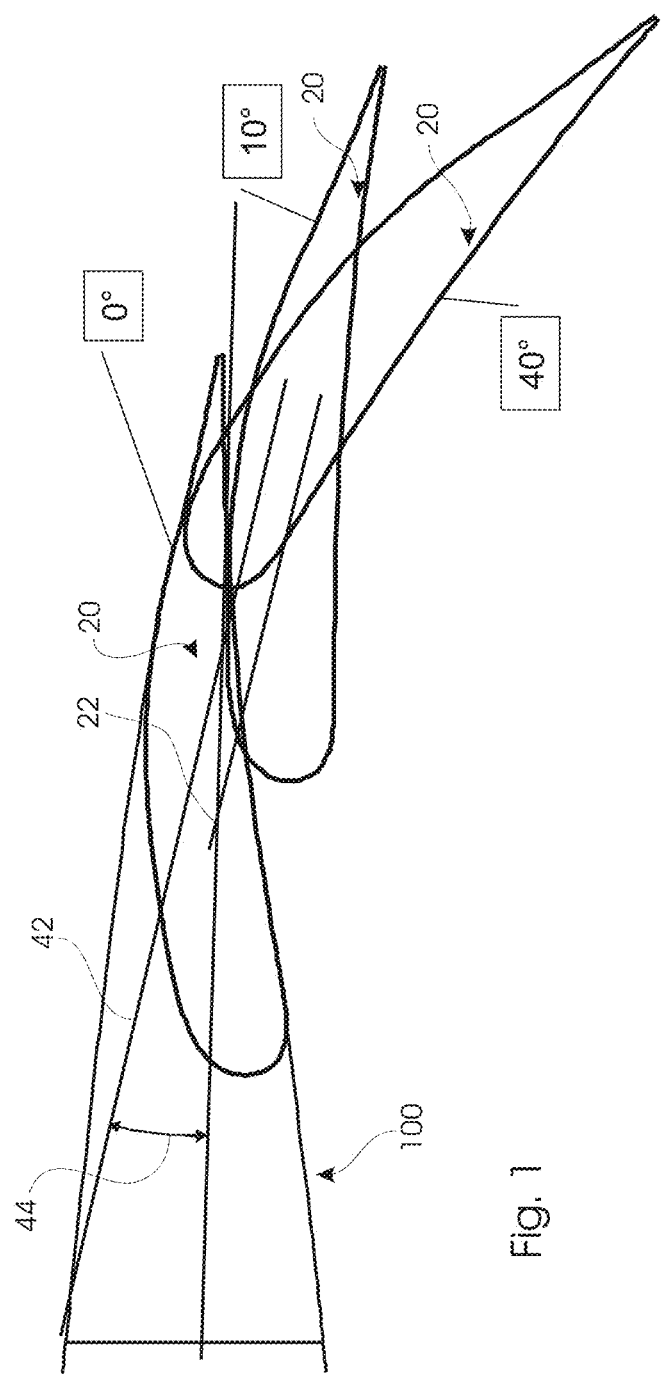
FIG. 1 is a schematic side view for ascertaining the translation angle.
Figure 2:
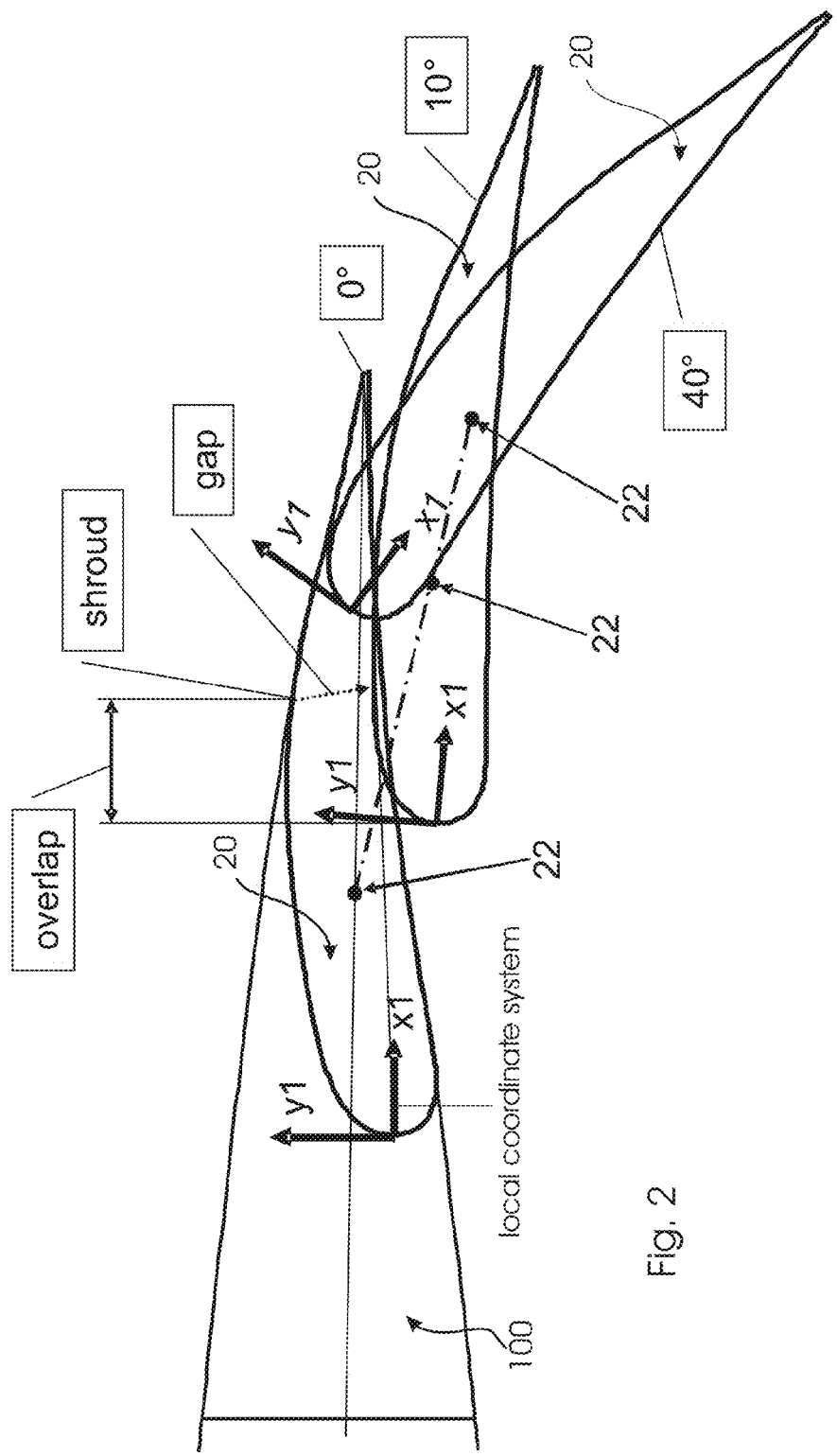
FIG. 2 is a schematic side view for ascertaining the pivot bearing point.

As can be seen in FIG. 1, for the pivot bearing points 22 in the 0° and 40° positions a line passes through these two points, which line is defined as a line of translational movement 42. A translation angle 44 is subsequently ascertained, at which the pivot bearing point 22 of the 10° position is arranged as close as possible to the line of translation. FIG. 1 shows the respective pivot bearing points 22 for different translation angles 44. It can be seen in FIG. 1 that as the angle changes, the line of translation moves downward and the pivot bearing points 22 move out of the cross-section of the trailing-edge flap 20. Since the entire system is to be as compact as possible, a translation angle 44 is selected, at which the pivot bearing point 22 lies within the trailing-edge flap 20. In this instance "within" means that enough radial space is still provided for the necessary bearing at the pivot bearing point 22. The pivot bearing point 22 is therefore advantageously distanced at least 10 mm in the vertical direction from the outer contour of the trailing-edge flap 20. In the embodiment in FIGS. 1 and 2 the combination of the individual conditions for the translation angle 44, the line of translatory movement 42 and the pivot bearing point 22 gives a translation angle 44 ranging from 13.5° and 15.5°.

Figure 3:
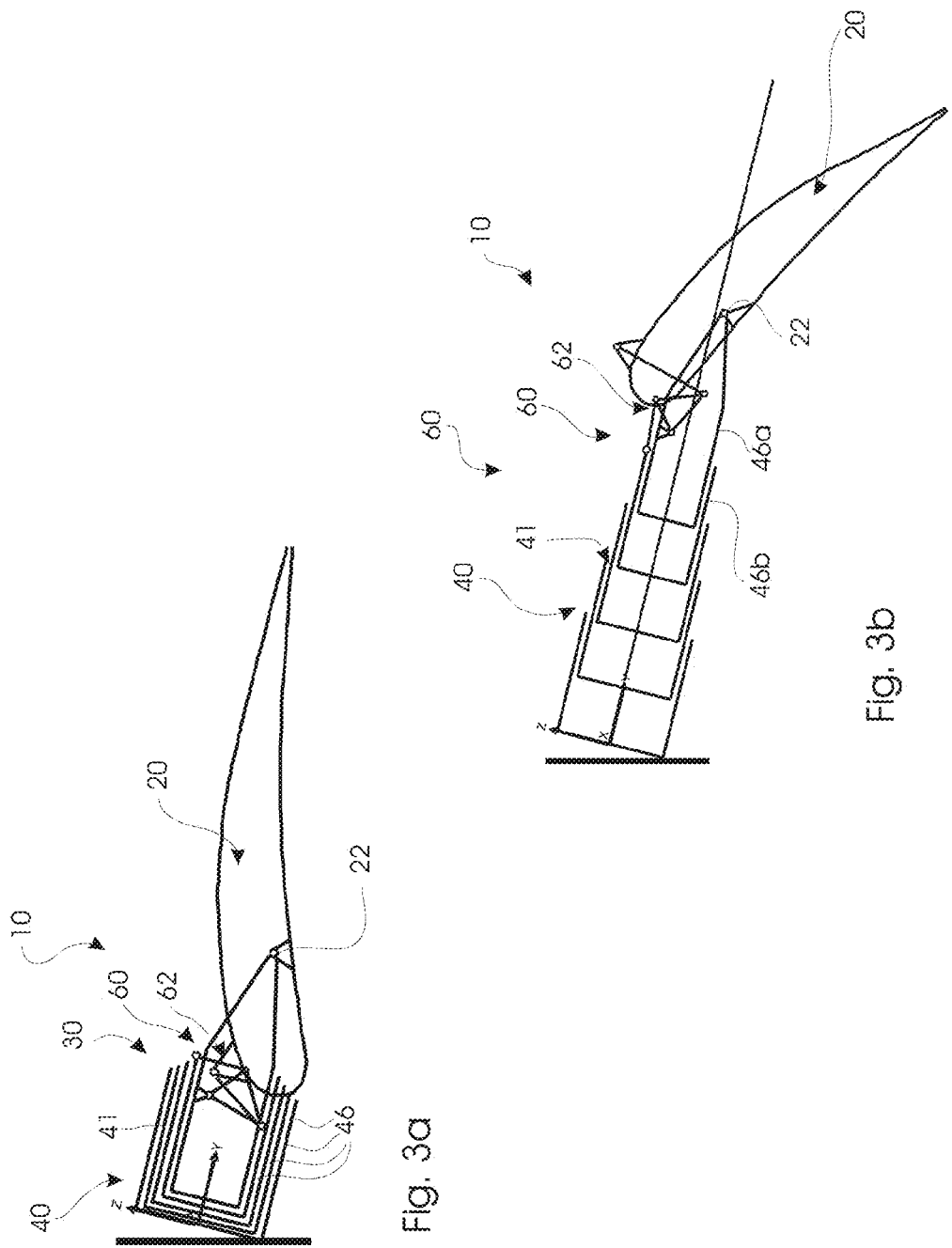
FIG. 3a is a schematic side view of a trailing-edge flap system according to an embodiment of the invention in the retracted state.
FIG. 3b is a schematic side view of a trailing-edge flap system according to an embodiment of the invention in accordance with FIG. 3a in the refracted state.

An embodiment of a trailing-edge flap system 10 is illustrated schematically in FIGS. 3a and 3b. FIG. 3a shows this system in the retracted state and FIG. 3b shows this system in the extended state. The basic operating principle will be described with reference to these two figures. During cruising the trailing-edge flap 20 is in the completely retracted state, i.e. in the 0° position. A movement device 30 is provided for moving the trailing-edge flap 20 into the 10° and 40° positions as well as into other intermediate positions. This movement device 30 includes a translatory mover 40 and a rotational mover 60. The two movement components of translation and rotation can thus be constructed separately from one another. The translatory mover 40 is configured as a telescope drive 41, which includes five individual telescopic boxes 46. These telescopic boxes 46 are arranged nested in one another and move relative to one another when the trailing-edge flap 20 is extended. The rotational mover 60 is configured as lever kinematics 62 that rotate the trailing-edge flap 20 as a function of the translatory movement. Reference should be made to the fact that FIGS. 3a and 2b only show both extreme states of the trailing-edge flap 20 and said trailing-edge flap 20 can be moved in any desired manner between these extreme situations.

In FIGS. 3a and 3b the pivot bearing point 22 can be seen clearly arranged within the trailing-edge flap 20. As a result of this arrangement and the installation of the telescope drive 41 in the ascertained translation angle 44, FIG. 3a shows the compactness of this system in the cruising position where neither the rotational mover 60 nor the translatory mover 40 protrudes downward. When using a trailing-edge flap system 10 of this type for an aerofoil 100 it is thus possible to dispense with fairings in this region.

It can be seen further from FIGS. 3a and 3b how the correlation of the translatory mover 40 and of the rotational mover 60 is achieved. There is thus a first articulation of the lever kinematics 62 to the last telescopic box 46a, whilst the second articulation of the lever kinematics 62 lies at the penultimate telescopic box 46b. The distance between the two articulations thus changes as a result of the relative movement of these two telescopic boxes 46a and 46b to one another, which in turn moves the lever kinematics 62. Depending on the relative position of the two articulations, the lever kinematics 62 is arranged in different positions, which inter alia also correspond to the three design positions of 0°, 10° and 40°.

The trailing-edge flap 20 is mounted at the pivot bearing point independently of the lever kinematics 62. The weight force of the trailing-edge flap 20 is exclusively supported downwardly by the pivot bearing point 22. The lever kinematics 62 does not have to take on this mounting task and can therefore be configured so as to be correspondingly lighter.

Figure 4:
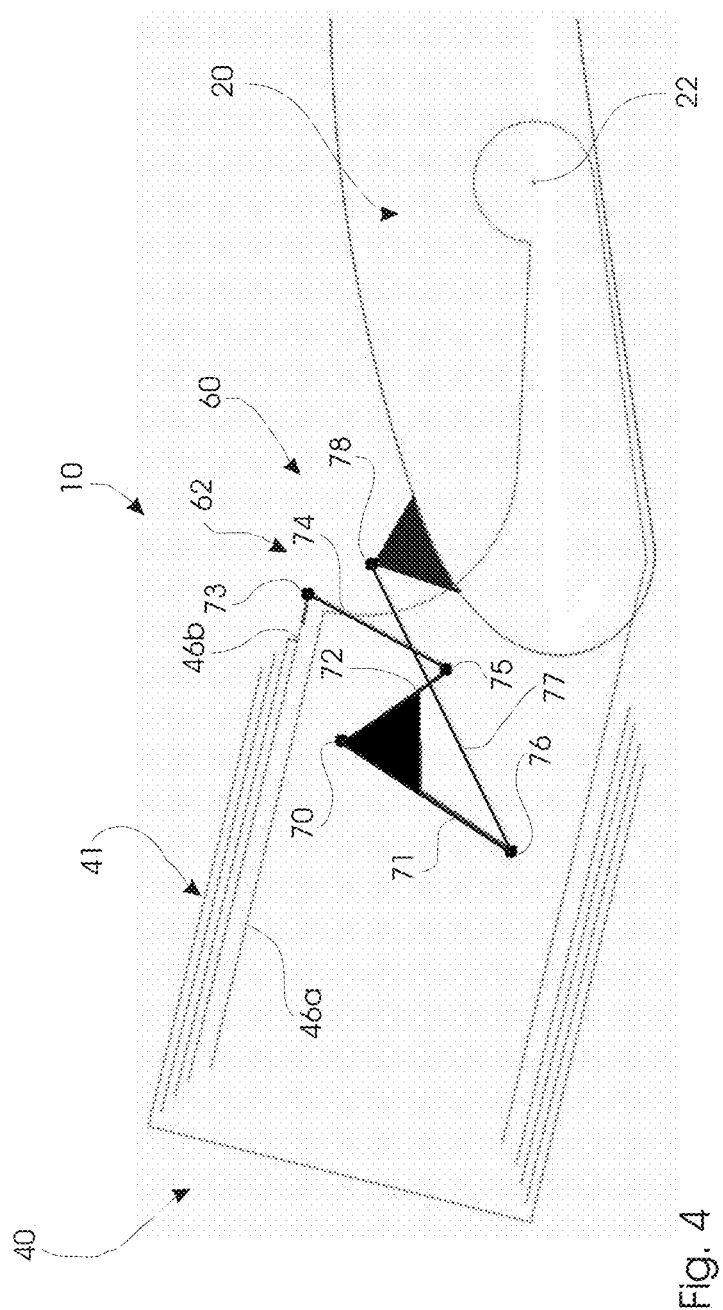
FIG. 4 is a schematic side view of a first lever kinematics for a trailing-edge flap system according to an embodiment of the invention.
Figure 5:
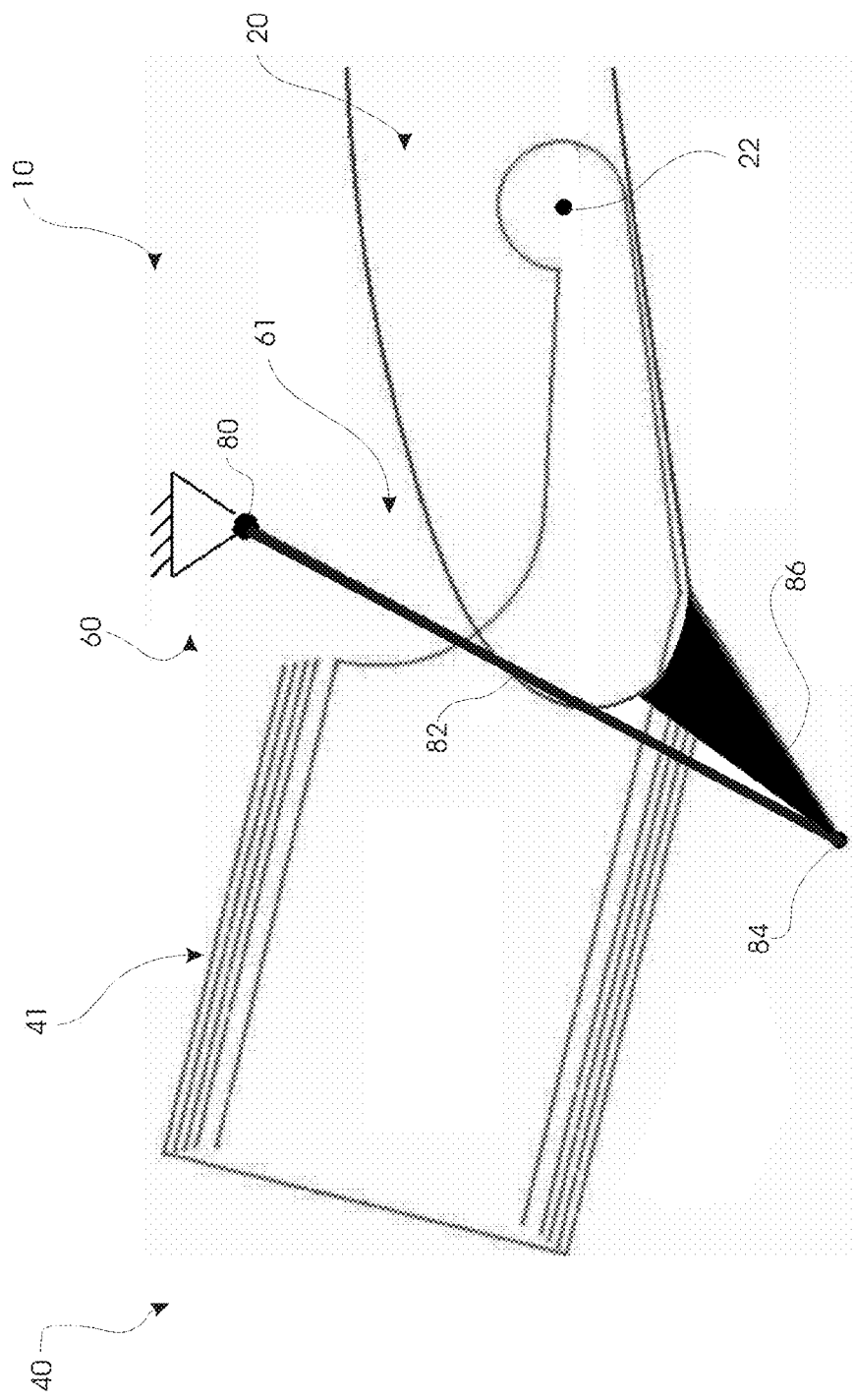
FIG. 5 is a schematic side view of a second lever kinematics for a trailing-edge flap system according to an embodiment of the invention.
Figure 6:
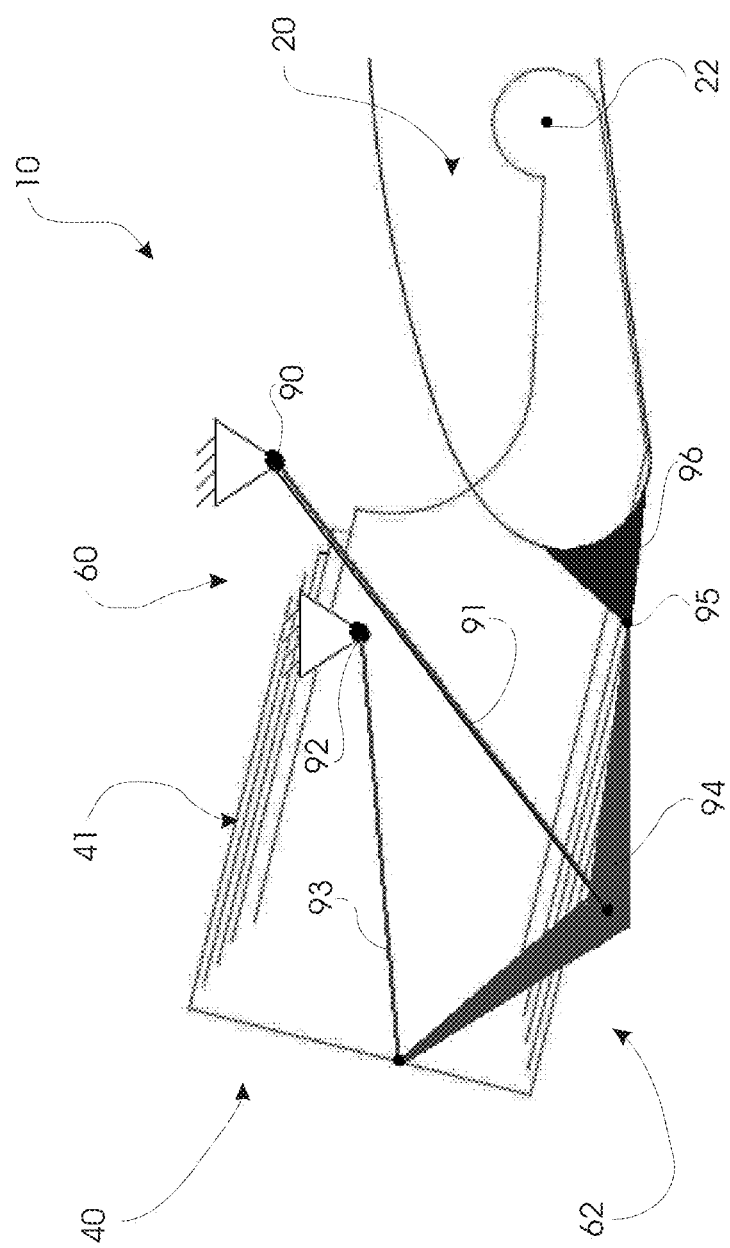
FIG. 6 is a schematic side view of a third lever kinematics for a trailing-edge flap system according to an embodiment of the invention.

FIGS. 4, 5 and 6 show schematic views of different embodiments for the lever kinematics 62.

FIG. 4 thus shows a first kinematics design with five pivots, two free levers and two levers at a fixed angle to one another. This lever kinematics 62 utilises the relative movement between the last and the penultimate telescopic boxes 46a and 46b of the telescope drive 41. A first lever 71 and a second lever 72, which have a fixed angle to one another, are articulated at a first pivot 70. This first pivot is rigidly connected to the last telescopic box 46a of the telescope drive 41. A second pivot 73 is attached to the penultimate telescopic box 46b of the telescope drive 41. A third lever 74, which is connected to the second lever 72 in an articulated manner, is arranged at this second pivot. The linear relative movement of the two telescopic boxes 46a and 46b is converted into a rotational movement by these three levers 71, 72 and 74. A fourth lever 77, which is guided between a fourth pivot 76 at the end of the first lever 71 and a fifth pivot 78 at the trailing-edge flap 20, is provided in order to utilize this rotational movement for rotation of the trailing-edge flap. A translatory movement of the telescope drive 41 thus rotates the trailing-edge flap 20 via the lever kinematics 62. Various possibilities are technically feasible for achieving a defined relative movement of the two telescopic boxes 46a and 46b. The use of a synchronising telescope cylinder is thus conceivable and makes it possible to achieve a defined extension of the telescope drive 41. Alternatively, control gears can also be provided between the individual telescopic boxes 46 in order to generate this defined relative movement.

In order to achieve greater conversion of translatory movement into rotational movement, the concept illustrated in FIG. 4 can be changed, for example so the second pivot is articulated at the antepenultimate telescopic box 46c. A greater relative movement for the rotation and, with a very similar lever kinematics 62, a stronger rotation can thus be achieved.

FIG. 5 shows a further concept for lever kinematics 62. In this concept a single stationary pivot 80 is provided that is fixed to an aerofoil, for example to a spar of the aerofoil during installation of the trailing-edge flap system 10. A second pivot 84 is further provided at a connection bar 86 of the trailing-edge flap 10. A single lever 82 extends between these two pivots. In contrast to the kinematics from FIG. 4, in this instance the relative movement of the trailing-edge flap to the aerofoil is used to generate a rotation. A substantial advantage of this solution is the free extendibility of the individual telescopic boxes 46. Control gears between the individual telescopic boxes 46 would no longer be necessary, at least for kinematic reasons.

FIG. 6 shows a further embodiment of lever kinematics 62. It includes two stationary pivots 90 and 92, to which respective levers 91 and 93 are attached. The relative movement of the telescope drive 41 to the two stationary pivots 90 and 92 is converted into a rotational movement via a rigid angle lever 94 and transferred to the trailing-edge flap 20 via a pivot 95 and a connection bar 96. Although this system is more complex than that shown in FIG. 5, it requires no space outside the trailing-edge flap 20 in the retracted state. The amount of rotation required for the trailing-edge flap 20 can be set by the precise placing of the two stationary pivots 90 and 92 relative to one another.

Figure 7:
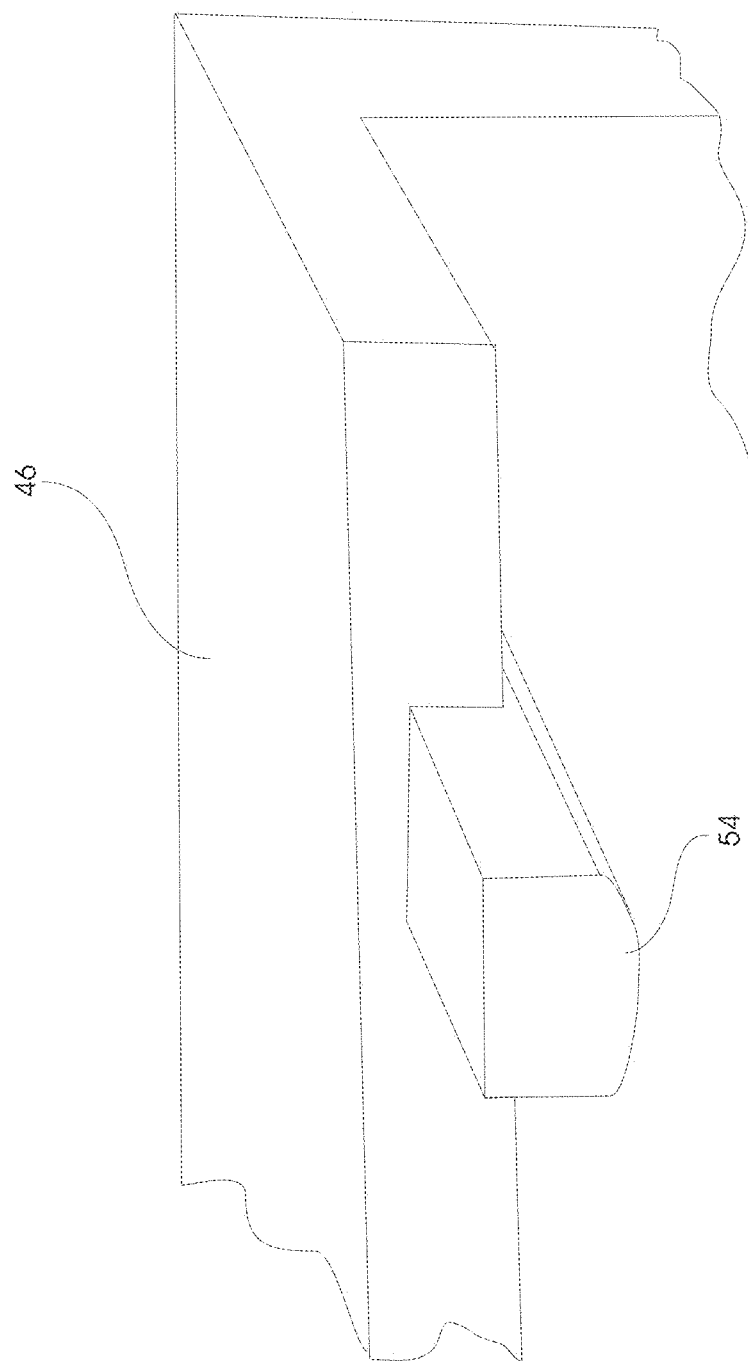
FIG. 7 is an isometric partial view through an embodiment of a telescopic box with sliding cushions.

As shown in FIG. 7, sliding cushions 54 are provided between the individual telescopic boxes 46 in order to remove the bending and torsional forces from the trailing-edge flap 20 and to simultaneously ensure reliable movement of the individual telescopic boxes 46 relative to one another. These sliding cushions 54 lie in recesses in each of the telescopic boxes 46 in such a way that they are protected against shifting. The sliding cushions 54 are rounded so the relative movement between the two adjacent telescopic boxes 46 can be carried out as easily as possible and with constant surface pressure.

Figure 9A:
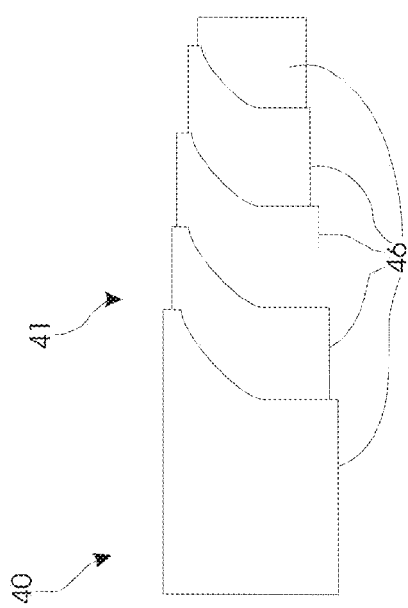
FIG. 9a is a side view of a further embodiment of overlapping telescopic boxes.
Figure 9B:
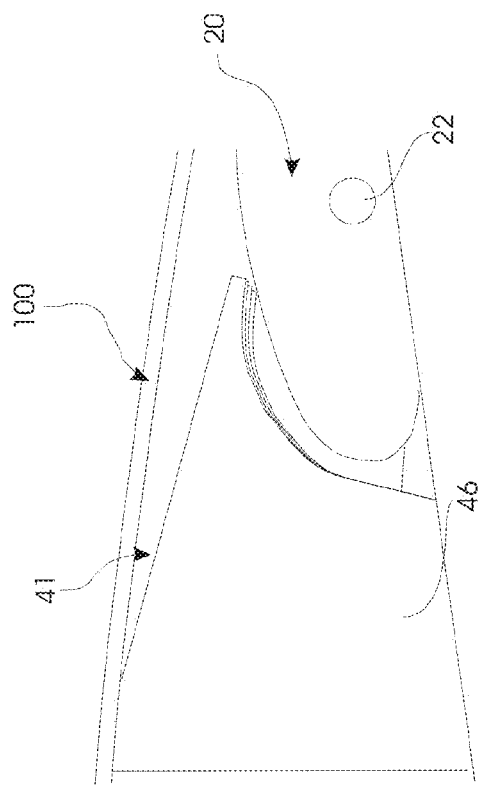

FIGS. 9a and 9b show a further optimised embodiment of the telescopic boxes 46. In order to further improve the upward support of the air load, the individual telescopic boxes 46 include extensions at the upper face that therefore enlarge the overlap. The enlarged overlap is adapted to the outer contour of the trailing-edge flap 20, as can be seen in FIG. 9b. The enlargement of the overlap is thus possible without additional construction space and thus without additional fairing at the lower face of the aerofoil 100. The desired overlap can thus be provided in the region in which the main load direction of the air load lies during flight operations. Material and therefore weight savings at the lower face can thus be achieved with reinforcement of the translatory mover 30.

Figure 8:
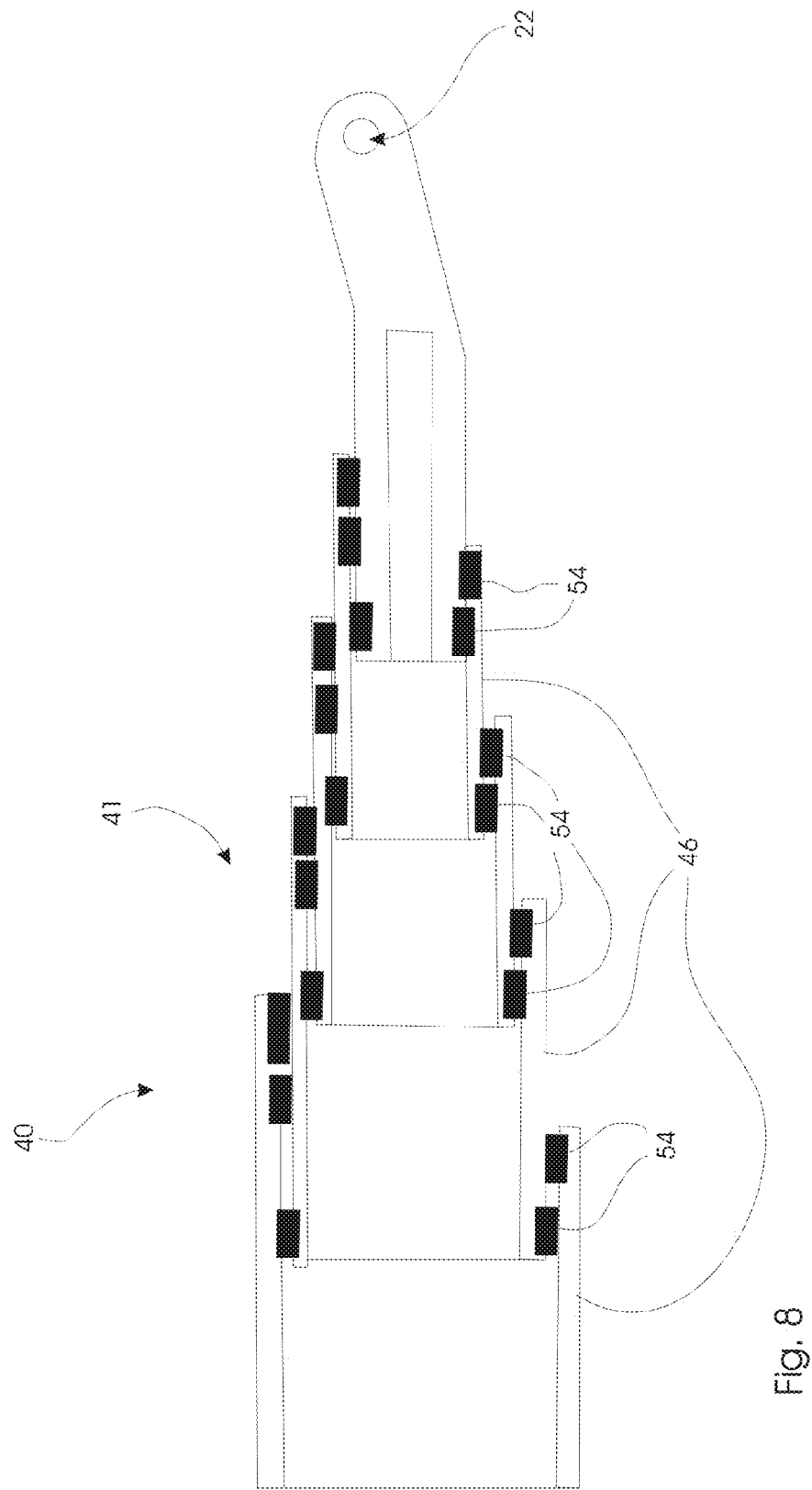
FIG. 8 is a cross-section through an embodiment of a telescope drive with sliding cushions as a linear bearing.

As shown in cross-section in FIG. 8 however, with an extension of this type the support of the individual telescopic boxes 46 must be multiple in order to compensate for this overlap in the retracted state. The embodiment according to FIG. 8 thus includes 33% more sliding cushions 54 at the upper face than at the lower face.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A trailing-edge flap system comprising a trailing-edge flap and a movement device that moveably couples the trailing-edge flap to an aerofoil, the movement device comprising at least a translatory mover that translatory moves the trailing-edge flap and at least a rotational mover that rotationally moves the trailing-edge flap,
    wherein the translatory mover is configured as a telescope drive comprising several individual telescopic boxes which are arranged nested in one another and can be moved relative to one another for moving the trailing-edge flap along a line of translatory movement, wherein, when seen from the aerofoil, the trailing-edge flap is rotationally coupled to a last telescopic box whereby a pivot bearing point is defined,
    wherein
    the rotational mover is configured as a lever kinematics comprising: a stationary pivot being fixed to the aerofoil and being provided for a single lever that is coupled to the trailing-edge flap in a second pivot at the end of a connection bar.

2. The trailing-edge flap system according to claim 1, wherein the pivot bearing point lies in the region from 20% to 60% of the flap depth of the trailing-edge flap in the direction of flight.

3. The trailing-edge flap system according to claim 1, wherein a translation angle between the line of translatory movement and the chord line of the aerofoil belonging to the trailing-edge flap lies within the range between 10 degrees and 20 degrees such that the pivot bearing point for the pivot of rotation of the trailing-edge flap can be given from the aerodynamic demands placed on the translatory movement and rotational movement, which pivot bearing point in particular lies within the contour of the trailing-edge flap.

4. The trailing-edge flap system according to claim 1, wherein the telescopic boxes can be maximally extended with an at least partial overlap of more than 50%.

5. The trailing-edge flap system according to claim 4, wherein the overlap is only provided in the region in which the majority of the forces are transferred.

6. The trailing-edge flap system according to claim 4, wherein the maximum length of the arrangement of extended telescope boxes is defined as 2 to 4 times the distance between the aerofoil end of the arrangement of extended telescope boxes and the trailing-edge flap end of the telescope drive in the retracted state.

7. The trailing-edge flap system according to claim 1, wherein a synchronising telescope cylinder is provided for the arrangement of extended telescope boxes.

8. The trailing-edge flap system according to claim 1, wherein in each case sliding cushions are provided as a linear bearing for the transfer of force between the telescopic boxes.

9. The trailing-edge flap system according to claim 1, wherein control gears are provided between the individual telescopic boxes.

10. A wing for an aircraft comprising at least one trailing-edge flap system having the features of claim 1.

11. A method for moving a trailing-edge flap with regard to an aerofoil by a movement device, the method comprising:
    moving a single lever that is coupled to a stationary pivot being fixed to the aerofoil and to the trailing-edge flap in a second pivot at the end of a connection bar;
    moving several individual telescopic boxes along a line of translatory movement, wherein the telescopic boxes are arranged nested in one another relative to one another and wherein, when seen from the aerofoil, the trailing-edge flap is rotationally coupled to a last telescopic box whereby a pivot bearing point is defined.

12. The method according to claim 11, wherein the pivot bearing point lies in the region from 20% to 60% of the flap depth of the trailing-edge flap in the direction of flight.

13. The method according to claim 11, wherein a translation angle between the line of translatory movement and the chord line of the aerofoil belonging to the trailing-edge flap lies within the range between 10 degrees and 20 degrees such that the pivot bearing point for the pivot of rotation of the trailing-edge flap can be given from the aerodynamic demands placed on the translatory movement and rotational movement, which pivot bearing point lies within the contour of the trailing-edge flap.

14. The method according to claim 11, wherein the telescopic boxes can be maximally extended with an at least partial overlap of more than 50%.

15. The method according to claim 14, wherein the overlap is only provided in the region in which the majority of the forces are transferred.

16. The method according to claim 11, wherein the maximum length of the arrangement of extended telescope boxes is defined as 2 to 4 times the distance between the aerofoil end of the arrangement of extended telescope boxes and the trailing-edge flap end of the telescope drive in the retracted state.

17. The method according to claim 11, wherein a synchronising telescope cylinder is provided for the arrangement of extended telescope boxes.

18. The method according to claim 11, wherein in each case sliding cushions are provided as a linear bearing for the transfer of force between the telescopic boxes.

19. The method according to claim 11, wherein control gears are provided between the individual telescopic boxes.

* * * * *